United States Patent
Chen et al.

(10) Patent No.: US 9,263,800 B2
(45) Date of Patent: Feb. 16, 2016

(54) ARTIFICIAL SKIN FOR RADAR MANNEQUINS

(71) Applicants: Ohio State University, Columbus, OH (US); Indiana University Research and Technology Corporation, Indianapolis, IN (US); Toyota Motor Engineering & Manufacturing North America, Inc., Erlanger, KY (US); Toyota Jidosha Kabushiki Kaisha, Toyota Aichi (JP)

(72) Inventors: Chi-Chih Chen, Columbus, OH (US); Stanley Yung-Ping Chien, Indianapolis, IN (US); Rini Sherony, Ann Arbor, MI (US); Hiroyuki Takahashi, Toyota Aichi (JP)

(73) Assignees: Toyota Motor Engineering & Manufacturing North America, Inc., Erlanger, KY (US); Toyota Jidosha Kabushiki Kaisha, Toyota-shi (JP); The Ohio State University, Columbus, OH (US); Indiana University Research and Technology Corporation, Indianapolis, IN (US)

( * ) Notice: Subject to any disclaimer, the term of this patent is extended or adjusted under 35 U.S.C. 154(b) by 222 days.

(21) Appl. No.: 14/141,821

(22) Filed: Dec. 27, 2013

(65) Prior Publication Data

US 2015/0188233 A1 Jul. 2, 2015

(51) Int. Cl.
*H01Q 15/14* (2006.01)
*G01S 7/40* (2006.01)
*H01Q 1/52* (2006.01)
*H01Q 15/00* (2006.01)
*G01S 7/00* (2006.01)

(52) U.S. Cl.
CPC .............. *H01Q 15/14* (2013.01); *G01S 7/40* (2013.01); *H01Q 1/526* (2013.01)

(58) Field of Classification Search
CPC ......... H01Q 1/52; H01Q 1/526; H01Q 15/14; H01Q 17/00; H01Q 17/004; H01Q 17/005; H01Q 17/007; H01Q 17/008; G01S 7/02; G01S 7/40; G01S 7/4052; G01S 7/4004; G01S 13/88; G01S 13/89
USPC ................ 342/1–12, 165–175, 22, 118, 128, 342/130–132
See application file for complete search history.

(56) References Cited

U.S. PATENT DOCUMENTS

| | | | |
|---|---|---|---|
| 6,111,534 A | 8/2000 | Escarmant | |
| 6,521,829 B2 | 2/2003 | Matsumura et al. | |
| 6,797,401 B2 | 9/2004 | Herron | |
| 7,034,746 B1 * | 4/2006 | McMakin | G01S 13/89 342/175 |
| 7,123,185 B2 * | 10/2006 | Fleisher | G01S 13/89 342/22 |
| 7,180,441 B2 * | 2/2007 | Rowe | G01S 13/89 342/22 |

(Continued)

*Primary Examiner* — Bernarr Gregory
(74) *Attorney, Agent, or Firm* — Dinsmore & Shohl LLP

(57) ABSTRACT

An artificial skin for use on a radar mannequin exposed to electromagnetic radiation having a predetermined frequency and a radar mannequin having the artificial skin are provided. The artificial skin and the radar mannequin with the artificial skin are configured to produce a radar cross section that closely approximates the radar cross section of a human. The artificial skin includes a conductive layer of material and a shielding layer of material. The conductive layer and the shielding layer are configured to reflect electromagnetic radiation at a level of an electromagnetic response of human skin exposed to the electromagnetic radiation. The shielding layer also electromagnetically shields an inside surface of the artificial skin from electromagnetic radiation.

20 Claims, 6 Drawing Sheets

(56) References Cited

U.S. PATENT DOCUMENTS

| | | | |
|---|---|---|---|
| 7,202,808 B2* | 4/2007 | Fleisher | G01S 13/89 342/22 |
| 7,205,926 B2* | 4/2007 | Rowe | G01S 13/89 342/22 |
| 7,253,766 B2* | 8/2007 | Foote | G01S 13/89 342/22 |
| 7,265,709 B2* | 9/2007 | Fleisher | G01S 13/89 342/22 |
| 7,295,146 B2* | 11/2007 | McMakin | G01S 13/89 342/22 |
| 7,365,672 B2* | 4/2008 | Keller | G01S 13/89 342/22 |
| 7,405,692 B2* | 7/2008 | McMakin | G01S 13/89 342/22 |
| 7,755,539 B2* | 7/2010 | Narita | G01S 7/4004 342/165 |
| 7,773,205 B2* | 8/2010 | Cooper | G01S 13/89 342/132 |
| 7,973,697 B2* | 7/2011 | Reilly | G01S 13/89 342/22 |
| 7,978,120 B2* | 7/2011 | Longstaff | G01S 13/89 342/22 |
| 8,325,079 B2 | 12/2012 | Shah et al. | |
| 8,350,747 B2* | 1/2013 | DeLia | G01S 13/89 342/22 |

* cited by examiner

ARTIFICIAL SKIN FOR RADAR MANNEQUINS

FIELD OF THE INVENTION

The invention relates to an artificial skin for use on radar mannequins. More specifically, radar mannequins with the artificial skin produce radar cross sections (RCS) that closely approximate the RCS of real human subjects.

BACKGROUND OF THE INVENTION

Many vehicles make use of anti-collision systems to help reduce accidents between vehicles and hazards such as pedestrians, road obstructions, or other vehicles. These systems use interconnected sensor networks such as radar, optical sensors, infrared, or laser sensors to detect and track objects in the environment surrounding the vehicle.

While current anti-collision systems have become proficient and reliable in identifying objects like other vehicles and road obstructions, tracking pedestrians has proven more difficult. As collisions between vehicles and pedestrians are a very serious problem, the need exists for anti-collision systems that are capable of reliably identifying and tracking pedestrians.

Optical based sensors such as cameras usually can provide high-resolution images and wide observation field. However, these systems often require substantial computing and data processing to extracting target information. In addition, optical based systems are often limited by weather and lighting conditions.

While infrared technology can overcome some of the deficiencies of optical based sensors, these systems are still limited with respect to short range detection. Laser based sensor networks can provide accurate information regarding a target's position and distance. However, laser networks continue to have safety issues due to the lack of textured information about the targets.

Radar systems are well known in the art for measuring both distance and relative speed of objects surrounding vehicles. These systems can be used to improve the driver's ability to perceive objects when visibility is poor or in hard to see areas such as blind spots. Recently, the 76-78 GHz radar frequency band was allocated for automobile collision avoidance radar systems. Due to its longer detection range, better position resolution, and reduced sensitivity to various road and weather conditions, there is significant research and development on radar systems in this frequency range.

Compared to optical sensor systems, 76-78 GHz radar has the advantages of longer detection range, higher target position resolution, and better tolerance for poor weather and lighting conditions. In addition, radar data contains Doppler and micro Doppler signatures associated with motions of different moving parts of a target. This makes it ideal for pedestrian collision warning/avoidance systems on vehicles. Testing the effectiveness of such systems requires the use of special pedestrian mannequins that produce a radar response similar to a real human from different observation angles and in different postures.

The size and shape of an object are two of the factors that influence the response that the object will generate when exposed to a radar signal. Additionally, different surface materials produce different responses to 76-78 GHz radar. Therefore, to accurately test pedestrian collision systems, radar mannequins not only need to have body shapes that resemble real pedestrians, but also artificial skins that replicate the radar reflectivity of real human skin. In addition, the radar response generated by a real person is not consistent throughout their entire body. The response generated by a torso is different than the response generated by a lower leg. As such, the radar mannequin should be configurable to produce a non-uniform radar response.

It would therefore be beneficial to produce an artificial skin specifically designed for radar mannequins used in 76-78 GHz vehicular collision avoidance radar evaluations and testing. The artificial skin should enable a radar mannequin to produce radar cross section (RCS) pattern data that closely resembles that of a real person. A radar cross section is a measure of how detectable an object is with radar. The artificial skin is configured so that the radar mannequin, from the perspective of a radar system, appears like a human. In addition, as the radar response of a human can vary from one body part to another, the artificial skin should be easily configurable so that the response of specific body parts of the radar mannequin can match their real human counterparts.

SUMMARY OF THE INVENTION

An artificial skin for a radar mannequin and a radar mannequin having the artificial skin are provided. The artificial skin and the radar mannequins with the artificial skin are configured to produce RCS that closely approximate the RCS of real human subjects. The artificial skin includes a conductive layer of material and a shielding layer of material. The shielding layer is applied on an inner surface of the conductive layer. The conductive layer and the shielding layer are configured to reflect electromagnetic radiation having a predetermined frequency at a level of an electromagnetic response of human skin exposed to the electromagnetic radiation. The shielding layer also electromagnetically shields an inside surface of the artificial skin from electromagnetic radiation.

In one embodiment, the conductive and shielding layers can be made of a single layer of material or a plurality of layers of material. The conductive layer should have a mesh size that is configured to attenuate the electromagnetic radiation to produce a desired reflectivity at the predetermined frequency. Preferably, the mesh size is less than 0.05 times the wavelength of the electromagnetic radiation. The shielding layer should have a very low resistivity and be configured to reflect the electromagnetic radiation while electromagnetically shielding the inside surface of the artificial skin from the electromagnetic radiation.

The electromagnetic reflectivity of the artificial skin can be tuned by adjusting the number of the conductive and shielding layers used in the artificial skin. The electromagnetic reflectivity of the artificial skin can be tuned by adjusting the number of layers of material that make up a given conductive and/or shielding layer.

The conductive and shielding layers of the artificial skin can further be configured to replicate an electromagnetic response of human skin. In some instances, the artificial skin is configured to replicate human skin exposed to electromagnetic radiation having a predetermined frequency in a range of 8-80 GHz. In other instances, the artificial skin is configured to replicate human skin exposed to electromagnetic radiation having a predetermined frequency in a range of 76-78 GHz. As such, the artificial skin is tuned to produce the specific response of human skin exposed to a radar signal in the range of 80 GHz. However, in some instances the artificial skin is tuned to produce a specific response of human skin exposed to a radar signal in the range of 76-78 GHz.

The artificial skin is configured to reflect electromagnetic radiation having a predetermined frequency at a level generally equal to an electromagnetic response of human skin exposed to the electromagnetic radiation. The conductive and shielding layers can be configured so that the level is a radar cross section of human skin when exposed to electromagnetic radiation. In particular, electromagnetic radiation having a predetermined frequency in a range of 8-80 GHz or, more specifically, 76-78 GHz. The artificial skin reflection coefficient (ASRC) can further be approximately −4.7 dB+/−1 dB relative to the electromagnetic radiation transmitted to the artificial skin.

In another embodiment, the conductive layer is uniformly doped with conducting additives to have a predetermined bulk conductivity and a predetermined thickness. The predetermined bulk conductivity and the predetermined thickness are configured to reflect electromagnetic radiation of the predetermined frequency at the level generally equal to the electromagnetic response of human skin exposed to the electromagnetic radiation of the predetermined frequency.

In another embodiment, the conductive layer is a coating having a predetermined resistivity, the predetermined resistivity is configured to reflect electromagnetic radiation of the predetermined frequency at the level generally equal to the electromagnetic response of human skin exposed to the electromagnetic radiation of the predetermined frequency.

In another embodiment of the present invention, a radar mannequin for testing and calibrating 8-80 GHz or, more specifically, 76-78 GHz radar systems is provided. The radar mannequin has a surface that is covered with the artificial mannequin skin described above. The mannequin further has an internal structure having a plurality of electronic components. The electronic components may include motors, sensors, or other testing electronics. The mannequin skin electromagnetically shields the internal structure and the electronic components from the electromagnetic radiation.

The radar mannequin body has a plurality of body parts configured to replicate various parts of the human body, for example arms, legs, etc. Different portions of the human body reflect electromagnetic radiation at different levels. The body parts of the radar mannequin can be configured so that each of the plurality of body parts reflects electromagnetic radiation at a predetermined body part specific level. The predetermined body part specific level for each of the radar mannequin body parts may be configured to replicate the electromagnetic response of a corresponding human body part. For example, the mannequin skin covering the arm portion of the radar mannequin may be configured to replicate the electromagnetic response of a human arm. Other parts of the radar mannequin skin may be similarly configured to match various portions of the human body.

The conductive and shielding layers of the radar mannequin skin may further be configured so that the predetermined body part specific level is a radar cross section of human skin when exposed to electromagnetic radiation. In particular, electromagnetic radiation having a frequency in a range of 8-80 GHz or, more specifically, 76-78 GHz. The predetermined level can further be set such that the reflection coefficient of the artificial skin is approximately −4.7 dB+/−1 dB. In this way, the radar mannequin is capable of accurately producing a RCS that closely approximate the RCS of real human subjects for testing and calibrating radar in a frequency in a range of 76-78 GHz.

DETAILED DESCRIPTION OF THE INVENTION

Figure 1:
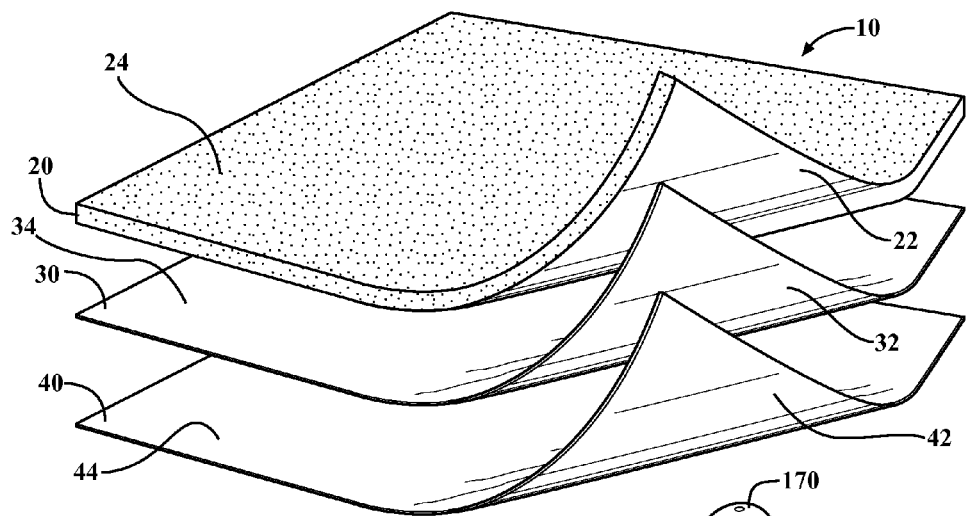
FIG. 1 is an exploded view of the layers of artificial skin.
Figure 2:
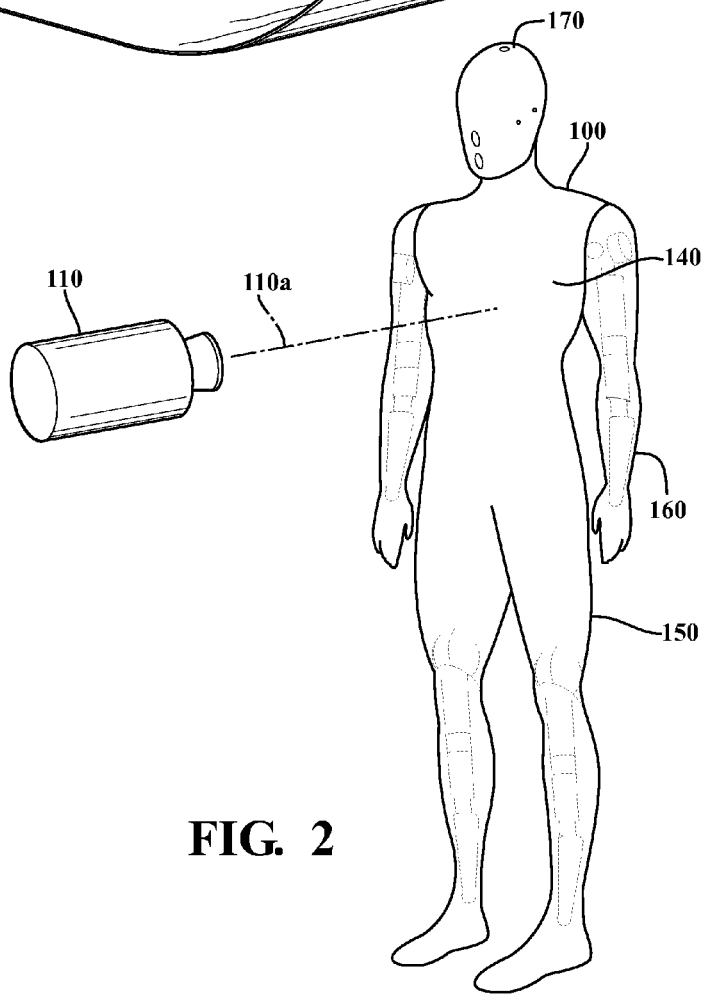
FIG. 2 is a depiction of a radar mannequin covered with the artificial skin.
Figure 3:
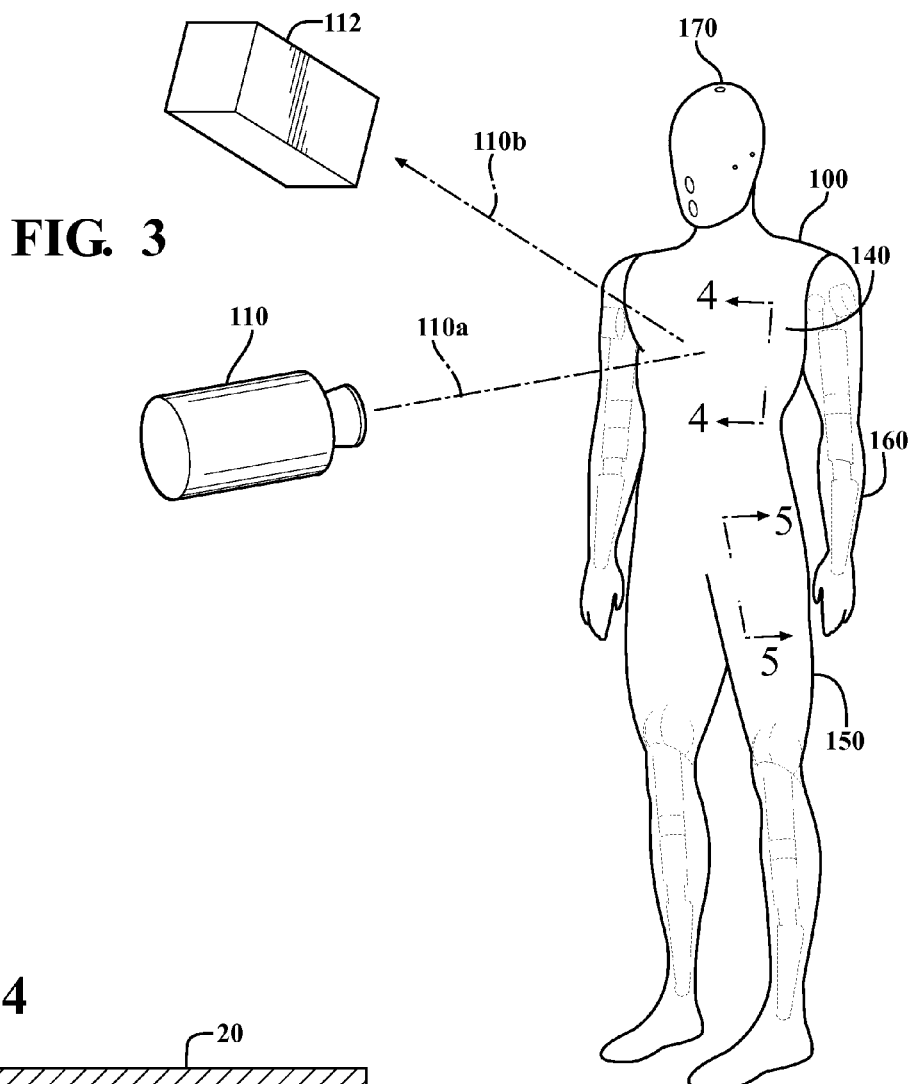
FIG. 3 is an illustration of a radar system measuring the response of a radar mannequin having the artificial skin.

With reference first to FIGS. 1 and 2, an artificial skin 10 for a radar mannequin 100 according to an embodiment of the invention is provided. The artificial skin 10 is made from a conductive layer 20 of material and a shielding layer 30 of material. The artificial skin 10 reflects electromagnetic radiation 110a such as from a radar transmitter 110 (FIG. 3) at a level which, more specifically, is an electromagnetic response of human skin exposed to the electromagnetic radiation. The conductive layer 20 has an inner surface 22 and outer surface 24. Also, the shielding layer 30 has an inner surface 32 and an outer surface 34.

In one embodiment, the conductive layer 20 material may generally be a blend of polyester, cotton, and stainless steel. In an example, the conductive layer 20 is made up of a blend of approximately 36% polyester, 36% cotton, and 28% stainless steel by weight. The resulting conductive layer 20 may have a thickness of approximately 1 mm, a weight of 260 g/m$^2$, and an electrical resistivity of 2000 Ohm/sq. An exemplary conductive layer 20 may be constructed from 2 sheets of STATICOT™ SHIELDING FABRIC (#1232) which is manufactured by Less EMF Inc. One skilled in the art will appreciate that other materials with properties similar to those described above will be suitable to use as the conductive layer 20 of the artificial skin 10.

The shielding layer 30 of material is applied on the inner surface 22 of the conductive layer 20. The conductive layer 20 and the shielding layer 30 may be held together with stitching, glue, or other bonding methods known in the art. The shielding layer 30 electromagnetically shields the inner surface 32 of the artificial skin 10 from the electromagnetic radiation 110a. The shielding layer 30 material may generally be a blend of polyester and copper. In an example, the shielding layer 30 is made up of a blend of approximately 65% polyester and 35% copper. The resulting shielding layer 30 may have a thickness of approximately 0.08 mm, a weight of 80 g/m$^2$, and an electrical resistivity of 0.05 Ohm/sq. An example of the shielding material 30 may be PURE COPPER POLYESTER TAFFETA FABRIC (#1212) which is manufactured by Less EMF Inc. One skilled in the art will appreciate that other materials with properties similar to those described above will be suitable to use as the shielding layer 30 of the artificial skin 10.

The conductive and shielding layers 20, 30 can be made of a single layer of material or a plurality of layers of material. The conductive layer 20 should have a mesh size that is configured to attenuate the electromagnetic radiation 110a to produce a desired reflectivity at the predetermined frequency. Preferably, the mesh size of the conductive and shielding layers 20, 30 is less than 0.05 times the wavelength of the electromagnetic radiation 110a. The shielding layer 30 should have a very low resistivity and be configured to reflect the electromagnetic radiation 110a while electromagnetically shielding the inside surface 32 of the artificial skin 10 from the electromagnetic radiation 110a.

The electromagnetic reflectivity of the artificial skin 10 can be tuned by adjusting the number of the conductive and shielding layers 20, 30 used in the artificial skin 10. The electromagnetic reflectivity of the artificial skin 10 can be tuned by adjusting the number of layers of material that make up a given conductive and/or shielding layer 20, 30.

In a typical collision avoidance system, the radar transmitter 110 transmits radar waves 110a towards a target. Reflected radar waves 110b are detected by a radar receiver 112. In the simplified example depicted in FIG. 3, the radar transmitter 110 transmits radar waves 110a towards the radar mannequin 100. The reflected radar waves 110b reflected by the radar mannequin 100 are detected by the radar receiver 112.

The artificial skin 10 is configured to have a radar reflectivity that approximates the radar reflectivity of human skin. It is appreciated that the human skin will produce a different radar reflectivity response depending on the frequency of the radar 110a used to detect the person. In some instances, the artificial skin 10 of the present invention is configured to have a radar reflectivity that approximately resembles that of human skin exposed to radar having a frequency range of 76-78 GHz. If the artificial skin 10 is designed to work with radar in this specific frequency range, one skilled in the art will appreciate that changing the frequency of the radar 110 will necessarily impact the performance of the artificial skin 10. Likewise, as the artificial skin 10 is configured to have a radar reflectivity that approximately resembles that of human skin, the artificial skin 10 is altered to accurately replicate the response of another type of target, such as an automobile or other common target.

Figure 4:
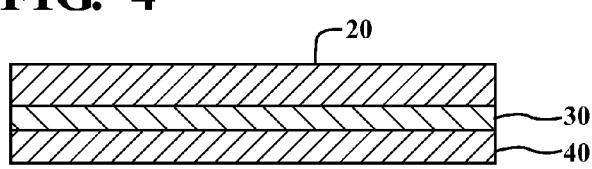
FIG. 4 is an exemplary view of the artificial skin along line 4-4 shown in FIG. 3.
Figure 5:
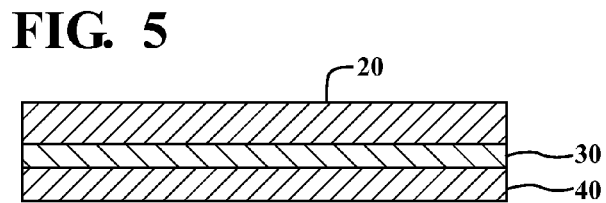
FIG. 5 is an exemplary view of the artificial skin along line 5-5 shown in FIG. 3.

The thickness of the layers 20, 30 of the artificial skin 10 can be manipulated to adjust the radar reflectivity of the artificial skin 10. For example, as shown in FIGS. 4 and 5, cross sectional views of a torso 140 and a leg 150 of the radar mannequin 100 are shown. In a preferred embodiment, the radar mannequin skin 10 on the leg 150 shown in FIG. 5 has the same thickness as the radar mannequin skin 10 on the torso 140 shown in FIG. 4. However, one skilled in the art will appreciate that the reflectivity of the artificial skin 10 can be adjusted by changing the thickness of the conductive layer 20. For example, assuming that the same material is used, a thicker conductive layer 20 would attenuate the radar waves 110a more than a mannequin skin 10 having a comparatively thinner conductive layer 20. In this way, the mannequin skin 10 can be tuned to more accurately replicate targets with different radar reflectivity.

The conductive layer 20 is made of resistive fabric and is responsible for producing reflectivity at a level similar to an electromagnetic response of human skin exposed to radar waves 110. For example, the conductive layer 20 produces reflectivity at a level similar to an electromagnetic response of human skin exposed to 76-78 GHz radar. The shielding layer 30 has a high electrical conductivity and serves as an electromagnetic shield to structures, components, etc. behind the inside surface 32 of the artificial skin 10. An additional foam layer 40 having an inside surface 42 and an outside surface 44 may or may not be located behind the shielding layer 30 for padding and contour shaping purposes.

While in one embodiment the artificial skin 10 has a conductive layer 20 and a shielding layer 30 made from a fabric mesh, one skilled in the art will appreciate that alternative configurations of the artificial skin 10 may be used to produce reflectivity at a level similar to an electromagnetic response of human skin exposed to 76-78 GHz radar.

In one alternative embodiment of the artificial skin 10, the conductive 20 layer is uniformly doped with conducting additives to have a predetermined bulk conductivity and a predetermined thickness. An exemplary conductive layer 20 is a copper continuous nylon layer having a dielectric constant of approximately 3.5. The conductive layer 20 is doped by conducting additives such as carbon to have different effective bulk conductivity. The predetermined bulk conductivity σ and the predetermined thickness d are configured to reflect electromagnetic radiation 110a of the predetermined frequency at the level generally equal to the electromagnetic response of human skin exposed to the electromagnetic radiation 110a of the predetermined frequency.

Table 1 below provides four examples relating the bulk conductivity σ of an exemplary carbon-doped copper continuous nylon conductive layer 20 with the thickness d of the layer to obtain the desired reflection coefficient of −4.7 dB.

TABLE 1

| | Bulk Conductivity σ (S/m) | Thickness (mm) |
|---|---|---|
| Example 1 | 1 | 3.42 |
| Example 2 | 2 | 2.30 |
| Example 3 | 5 | 1.19 |
| Example 4 | 10 | 0.37 |

In another embodiment, the artificial skin 10 has a thin conductive layer coating applied to a substrate. The shielding layer 30 can be a conductor such as copper that is painted with a thin conductive layer 20 coating. The conductive layer 20 coating has a predetermined resistivity that is configured to reflect electromagnetic radiation 110a at a level generally equal to that of human skin exposed to the same electromagnetic radiation 110a. In a preferred embodiment, the conductive layer 20 coating has a predetermined resistivity of approximately 100 Ohms per square, +/−2 Ohms per square, to produce a reflection coefficient of −4.7 dB.

One skilled in the art will appreciate that in the above described embodiments of the artificial skin 10, the reflectivity of the artificial skin 10 is determined at least in part by the density, thickness, and/or doping of the conductive layer 20. In this way, different materials may be used in the artificial skin 10 to produce reflectivity at a level similar to an electromagnetic response of human skin exposed to radar of a predetermined frequency, e.g. 76-78 GHz. Further, the materials used in the artificial skin 10 can be configured to have an ASRC of approximately −4.7 dB, +/−1 dB relative to the electromagnetic radiation 110a transmitted to the artificial skin 10.

The reflection coefficient Γ for a homogeneous material layer with a thickness of d, permittivity of $\epsilon_m$, permeability of $\mu_m$, and a good conducting backing can be expressed as:

$$\Gamma = R - \frac{(1 - R^2)e^{-j2\gamma_m d}}{1 - Re^{-j2\gamma_m d}} \quad (1)$$

where $$R = \frac{z_m - z_0}{z_m + z_0} \quad (2)$$

$$z_m = \sqrt{\mu_m/\varepsilon_m} \quad (3)$$

$$z_0 = \sqrt{\mu_0/\varepsilon_0} \quad (4)$$

$$\gamma_m = 2\pi f \sqrt{\mu_m \varepsilon_m} \quad (5)$$

The permittivity of $\epsilon_m$ and permeability of $\mu_m$ of potential materials can be obtained from known sources such as the manufacturer of the material or a look up table of known material properties.

The permittivity $\epsilon_m$ and permeability $\mu_m$ can be functions of frequency f, the permittivity of free-space $\epsilon_0$, and the permeability of free-space $\mu_0$. The material permittivity $\epsilon_m$ can also be expressed as a function of the dielectric constant $\epsilon_r$ and bulk conductivity σ as:

$$\varepsilon_m = \varepsilon_0 \varepsilon_r - j\frac{\sigma}{2\pi f \varepsilon_0 \varepsilon_r} \quad (6)$$

One skilled in the art will appreciate that by using equations (1)-(6), additional conductive layers 20 for the artificial skin 10 can be identified. The bulk conductivity σ and thickness d can be adjusted accordingly to configure the conductive layer 20 to have the desired reflection coefficient of −4.7 dB. Similarly, the conductive layer 20 can be configured to have an alternative reflection coefficient to accommodate different design parameters. In this way, equations (1)-(6) provide a way of achieving a desired reflection coefficient Γ based upon the frequency f, the permittivity of $\epsilon_m$, and the permeability of $\mu_m$ of potential materials.

From the foregoing, it is appreciated that as the frequency f changes, the desired reflection coefficient Γ should be likewise adjusted. Specifically, as the frequency f decreases, the desired reflection coefficient Γ should increase by approximately 0.027 dB per GHz. For example, if the frequency f is reduced by 20 GHz to a range of 56-53 GHz, the desired reflection coefficient Γ should increase by approximately 0.54 dB to approximately −4.16 dB.

As transmitted radar waves 110a are transmitted towards the artificial skin 10, the waves 110a propagate through the conductive layer 20 and undergo attenuation due to the resistivity thereof. This converts the electromagnetic energy from the radar waves 110a into heat. After passing through the thickness of the conductive layer 20, the radar waves 110a encounter the shielding layer 30. The shielding layer 30 reflects the radar 110a so that the reflected waves 110b propagate back through the conductive layer 20 once again and thus pass back through the thickness of the conductive layer 20 before exiting the artificial skin 20. As such, each pass of the radar wave into and out of the conductive layer 20 attenuates the radar waves 110a, 110b by approximately ½ of the total round-trip attenuation. As such, the total attenuation of the conductive layer 20 should be configured around 4.7 dB at 77 GHz to replicate the behavior of dry human skin.

Figure 6:
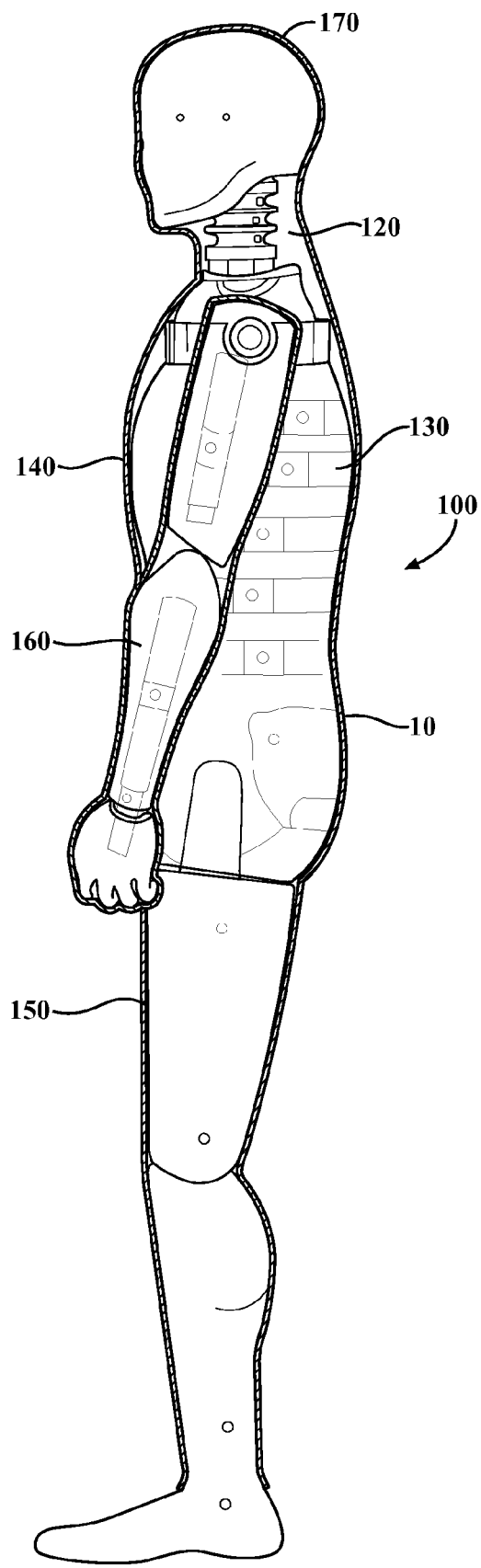
FIG. 6 is an exemplary view of the internal structure of a radar mannequin covered with the artificial skin.
Figure 7:
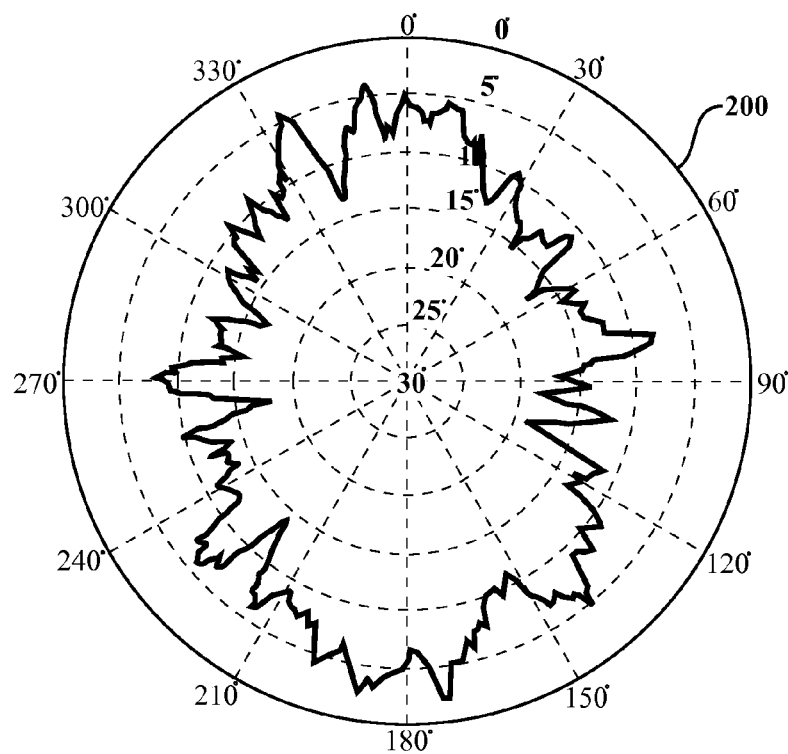
FIG. 7 depicts a radar mannequin covered with the artificial skin targeted with 77 GHz radar and an exemplary smoothed radar cross section pattern of the radar mannequin.
Figure 7:
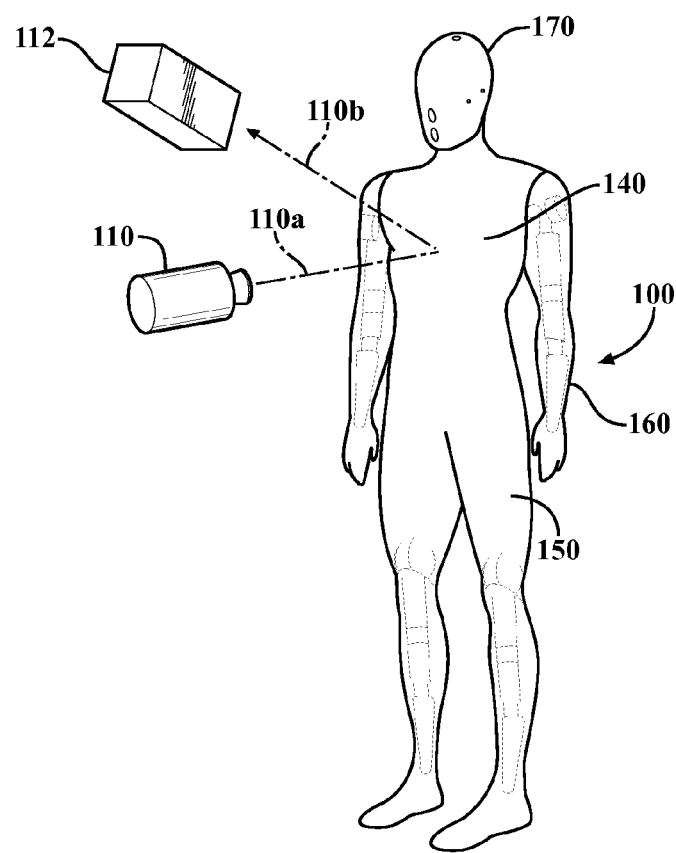
Figure 8:
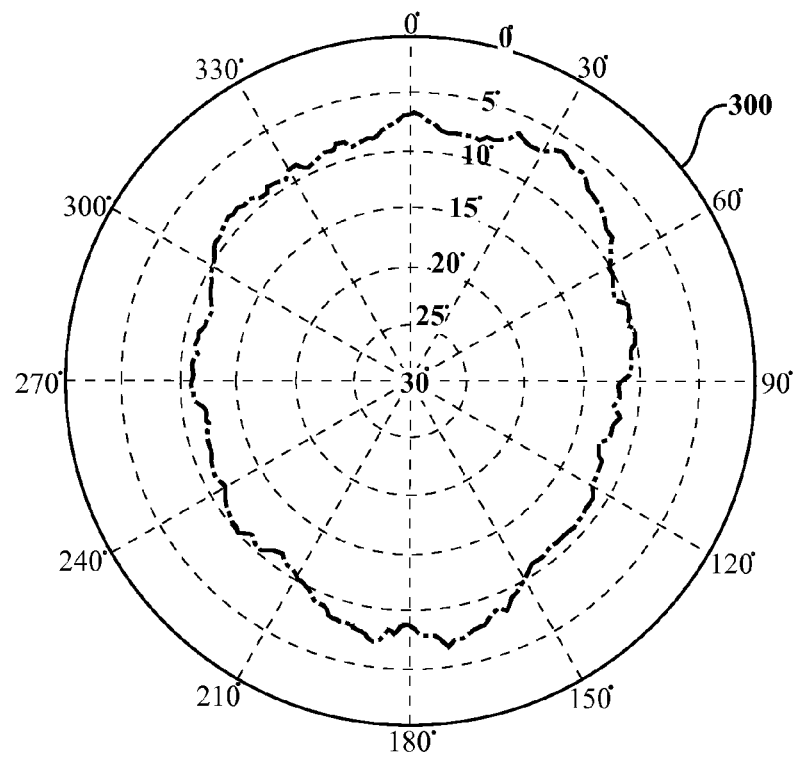
FIG. 8 depicts a human targeted with radar and a 77 GHz mean radar cross section pattern of an average adult human.
Figure 8:
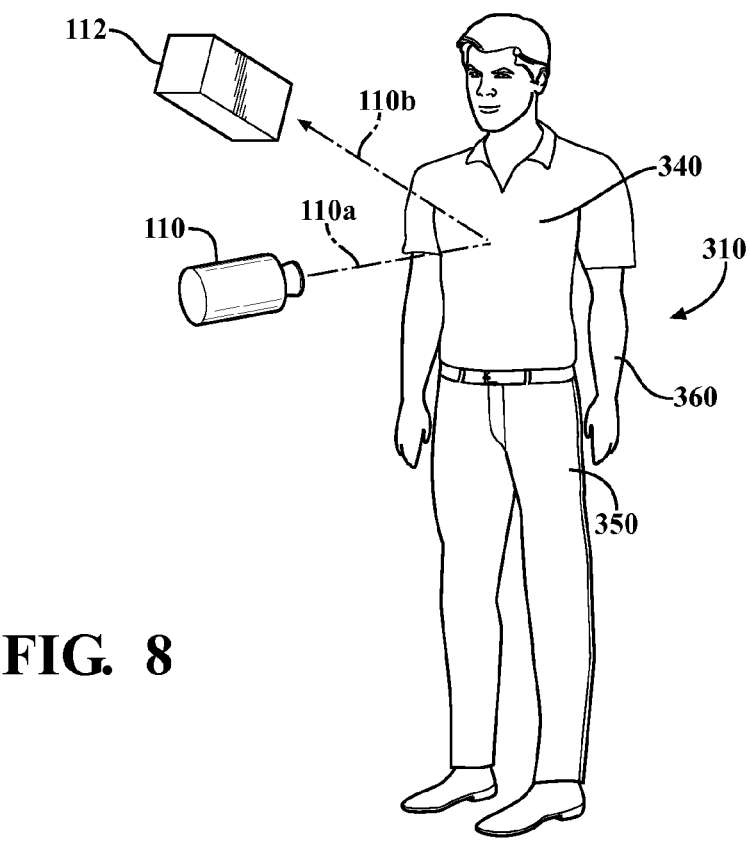

Turning now to FIGS. 6-8, in another preferred embodiment, the artificial skin 10 is applied to a surface area of a radar mannequin 100 for radar testing. The radar mannequin 100 is shaped to resemble a human body 310. The radar mannequin 100 is used to test and calibrate radar systems such as those used in vehicle anti-collision systems. The radar mannequin 100 has an internal structure 120 and a plurality of electronic components 130. The artificial skin 10 shields the internal structure 120, 130 of the radar mannequin 100 from the electromagnetic radiation 110a. The artificial skin 10 may further be configured so that the electromagnetic response reflected by body parts 140, 150, 160 of the radar mannequin 100 match those of corresponding body parts on a human body 340, 350, 360 (see FIG. 8).

The plurality of body parts 140, 150, 160 include a torso 140, legs 150, arms 160, and a head 170. Each of the mannequin body parts 140, 150, 160 are shaped to resemble corresponding body parts 340, 350, 360 on a human 310. For example, an arm 160 of the radar mannequin has a size and shape similar to that of a real human arm 360. Due to the change in size and shape, parts of the human body 340, 350, 360 reflect electromagnetic radiation to varying degrees. For example, a human torso 340 reflects electromagnetic radiation 110a differently than a human arm 360. Accordingly, the mannequin skin 10 on a specific body part of the radar mannequin 100 is configured to reflect electromagnetic radiation 110a at a specific level that matches that of a corresponding human body part.

Figure 9:
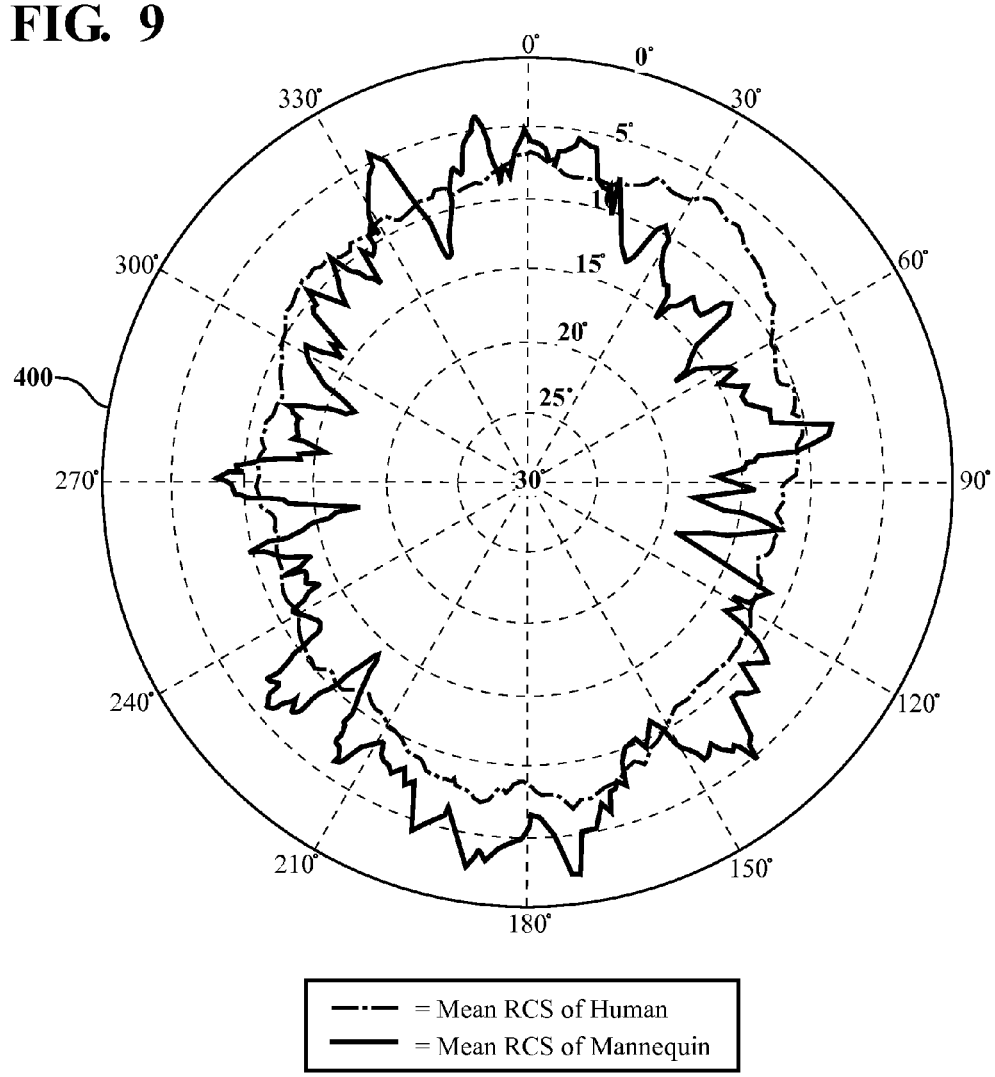
FIG. 9 is a radar cross section overlaying the exemplary smoothed radar cross section pattern of the radar mannequin covered with the artificial skin and the mean radar cross section pattern of an average adult human. at 77 GHz.

As shown in FIGS. 7-9, in order to validate the performance of the artificial skin 10, a smoothed radar cross section pattern 200 from the radar mannequin 100 covered by the artificial skin 10 was compared with an average smoothed radar cross section pattern 300 of several (eg. nine) human 310 test subjects. To obtain the smoothed radar cross section pattern 200, the radar mannequin 100 was placed on a rotating pillar in an anechoic chamber, as is well known in the art. The radar mannequin 100 was rotated while the electromagnetic radiation 110a at 77 GHz was transmitted from the radar transmitter 110. The reflected radar 110b was detected by the radar receiver 112 and the data was plotted. The smoothed radar cross section pattern 200 shown in FIG. 7 is the smoothed radar cross section pattern using a 5° moving window. It is appreciated that the smoothed pattern helps with visualizing main pattern variation without the rapid oscillations caused by in-phase and out-of-phase interferences from scattering of different body parts 140, 150, 160, 170 returning at different times.

The reflection coefficient of a planar electromagnetic field incident upon an air-material interface is given by Equation (2) from above:

$$R = \frac{z_m - z_0}{z_m + z_0} \quad (2)$$

Where $Z_m$ is the impedance of the material according to Equation (3) and $Z_0$ is the impedance of free space according to Equation (4). The impedance of a homogeneous conductive material $Z_m$ is a function of frequency ω (in radians), permeability u, permittivity $\epsilon$ and conductivity σ, and is given by $$z_m = \sqrt{\frac{j\omega\mu}{\sigma + j\omega\varepsilon}} \quad (7)$$

The approximate dielectric constant of dry human skin at 77 GHz is approximately 6.62. The conductivity of dry human skin at the same frequency is 38.1 S/m. It is therefore appreciated according to equations (2) and (7) that the reflection coefficient for dry human skin is approximately −4.68 dB at 77 GHz. These values are publically available and are known in the art.

It should also be appreciated that the radar cross section of a dry skin human is 4.68 dB lower than that of the same human model made of a perfect electrical conductor. As such, the artificial skin 10 is configured to have an ASRC of approximately −4.7 dB+/−1 dB relative to the reflection coefficient of a perfect electrical conductor to replicate the behavior of dry human skin.

As described above, the human radar reflection characteristics were measured using the same equipment and process as the radar mannequin 100. The range in size and body types of the human 310 test subjects was representative of typical humans. The smoothed radar cross section pattern 300 at 77 GHz of all nine subjects is shown in FIG. 8.

In order to validate the smoothed radar cross section pattern 200 from the radar mannequin 100 having the artificial skin 10, the smoothed radar cross section pattern 300 of the nine human 310 test subjects (dashed line) was compared to the smoothed radar cross section pattern of the radar mannequin 100 (solid line) as shown in FIG. 9.

FIG. 9 demonstrates that the radar mannequin 100 with the artificial skin 10 produces radar cross section levels and patterns similar to an average human 310 subject. The smoothed radar cross section pattern 200 level of the radar mannequin 100 is also approximately 2 dB higher than the human smoothed radar cross section pattern 300 level at a side looking angle. This is due to the fact that the front-to-back thickness of the radar mannequin's torso 140 used in the testing was thicker than an average adult male.

It is appreciated that the artificial skin 10 produces a reflection coefficient of approximately −4.7 dB at 76.5 GHz. It is appreciated that this reflection coefficient is similar to that of dry human skin. The measured smoothed radar cross section pattern 200 data of the radar mannequin 100 covered by the artificial skin 10 exhibited similar radar reflection characteristics when compared with the smoothed radar cross section pattern 300 of human 310 test subjects. As such, this test data demonstrates that the artificial skin 10 reflects 77 GHz radar at a level of an electromagnetic response of human skin exposed to the electromagnetic radiation.

Obviously, many modifications and variations of the present invention are possible in light of the above teachings and may be practiced otherwise then as specifically described while within the scope of the appended claims.

The invention claimed is:

1. An artificial skin for use on a mannequin exposed to electromagnetic radiation having a predetermined frequency, the artificial skin comprising:
   a conductive layer of material having an inner surface; and
   a shielding layer of material applied on the inner surface of the conductive layer of material;
   the conductive layer and the shielding layer configured to reflect electromagnetic radiation of the predetermined frequency at a level generally equal to an electromagnetic response of human skin exposed to the electromagnetic radiation of the predetermined frequency; and
   the artificial skin having an inside surface, the conductive layer and the shielding layer electromagnetically shielding the inside surface of the artificial skin from electromagnetic radiation.

2. The artificial skin of claim 1, wherein the predetermined frequency is within a range between 8-80 GHz and the artificial skin has an artificial skin reflection coefficient (ASRC) generally equal to a human skin reflection coefficient (HSRC) exposed to the electromagnetic radiation within the range between 8-80 GHz.

3. The artificial skin of claim 2, wherein the predetermined frequency is within a range between 76-78 GHz.

4. The artificial skin of claim 3, wherein the ASRC is approximately −4.7 dB, +/−1 dB relative to the electromagnetic radiation transmitted to the artificial skin and the HSRC is approximately −4.7 dB, +/−1 dB.

5. The artificial skin of claim 1, wherein the conductive layer is uniformly doped with conducting additives to have a predetermined bulk conductivity and a predetermined thickness, the predetermined bulk conductivity and the predetermined thickness configured to reflect electromagnetic radiation of the predetermined frequency at the level generally equal to the electromagnetic response of human skin exposed to the electromagnetic radiation of the predetermined frequency.

6. The artificial skin of claim 5, wherein the predetermined bulk conductivity ($\sigma$) and the predetermined thickness (d) of the conductive layer are configured to have an artificial skin reflection coefficient ($\Gamma$) according to:

$$\Gamma = R - \frac{(1-R^2)e^{-j2\gamma_m d}}{1-Re^{-j2\gamma_m d}}$$

where $$R = \frac{z_m - z_0}{z_m + z_0}$$

$$z_m = \sqrt{\mu_m/\varepsilon_m}$$

$$z_0 = \sqrt{\mu_0/\varepsilon_0}$$

$$\gamma_m = 2\pi f \sqrt{\mu_m \varepsilon_m}$$

$$\varepsilon_m = \varepsilon_0 \varepsilon_r - j\frac{\sigma}{2\pi f \varepsilon_0 \varepsilon_r}$$

and
f=Frequency,
$\epsilon_0$=Permittivity of Free-Space
$\mu_0$=Permeability of Free-Space
$\epsilon_m$=Permittivity of Conductive Layer
$\mu_m$=Permeability of Conductive Layer
$\epsilon_r$=Dielectric Constant of Conductive Layer
$\sigma$=Bulk Conductivity of Conductive Layer
j=Imaginary Number.

7. The artificial skin of claim 1, wherein the conductive layer is a coating having a predetermined resistivity, the predetermined resistivity configured to reflect electromagnetic radiation of the predetermined frequency at the level generally equal to the electromagnetic response of human skin exposed to the electromagnetic radiation of the predetermined frequency.

8. The artificial skin of claim 7, wherein the predetermined resistivity is approximately 100 Ohms/square, +/−2 Ohms per square.

9. The artificial skin of claim 1, wherein the conductive layer of material is a mesh having a mesh size less than 0.05 times a wavelength of the electromagnetic radiation.

10. The artificial skin of claim 9, wherein the conductive layer is a plurality of layers having a combined resistivity of 2000 Ohms per square.

11. The artificial skin of claim 1, wherein the shielding layer of material is a mesh having a mesh size less than 0.05 times a wavelength of the electromagnetic radiation.

12. The artificial skin of claim 11, wherein the shielding layer is a plurality of layers having a combined resistivity of 0.05 Ohms per square.

13. The artificial skin of claim 1, wherein the artificial skin is applied to a body.

14. A mannequin for radar testing comprising:
a mannequin body having a surface;
a mannequin skin having a shielding layer of material and a conductive layer of material;
the mannequin skin applied to the surface of the mannequin body, the mannequin skin configured to reflect electromagnetic radiation of a predetermined frequency at a level generally equal to an electromagnetic response of human skin exposed to the electromagnetic radiation of the predetermined frequency; and
the mannequin skin having an inside surface, the conductive layer and the shielding layer electromagnetically shielding the inside surface of the mannequin skin from electromagnetic radiation.

15. The mannequin of claim 14, wherein the mannequin body has an internal structure and a plurality of electronic components, the mannequin skin electromagnetically shielding the internal structure and the plurality of electronic components from the electromagnetic radiation.

16. The mannequin of claim 14, wherein the predetermined frequency is within a range between 8-80 GHz and the mannequin skin has an artificial skin reflection coefficient (ASRC) generally equal to a human skin reflection coefficient (HSRC) exposed to the electromagnetic radiation within the range between 8-80 GHz.

17. The mannequin of claim 16, wherein the predetermined frequency is within a range between 76-78 GHz.

18. The mannequin of claim 17, wherein the ASRC is approximately −4.7 dB, +/−1 dB relative to the electromagnetic radiation transmitted to the mannequin skin and the HSRC is approximately −4.7 dB, +/−1 dB.

19. The mannequin of claim 14, wherein the mannequin body has a plurality of body parts, the mannequin skin reflecting the electromagnetic radiation from each of the plurality of body parts at a predetermined body part specific level.

20. The mannequin of claim 19, wherein the mannequin skin is configured so that the predetermined body part specific level replicates an electromagnetic response of a corresponding human body part exposed to the electromagnetic radiation.

* * * * *